US007523228B2

(12) United States Patent
Biran et al.

(10) Patent No.: US 7,523,228 B2
(45) Date of Patent: Apr. 21, 2009

(54) METHOD FOR PERFORMING A DIRECT MEMORY ACCESS BLOCK MOVE IN A DIRECT MEMORY ACCESS DEVICE

(75) Inventors: Giora Biran, Zichron-Yaakov (IL); Luis E. De la Torre, Austin, TX (US); Bernard C. Drerup, Austin, TX (US); Jyoti Gupta, Austin, TX (US); Richard Nicholas, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 11/532,562

(22) Filed: Sep. 18, 2006

(65) Prior Publication Data

US 2008/0126602 A1    May 29, 2008

(51) Int. Cl.
*G06F 13/28* (2006.01)
*G06F 3/00* (2006.01)
(52) U.S. Cl. ............... 710/22; 710/24; 710/28; 710/36; 710/52; 710/57
(58) Field of Classification Search .......... 710/22, 710/24, 28, 36, 52, 57
See application file for complete search history.

(56) References Cited

U.S. PATENT DOCUMENTS

| 6,981,074 | B2 | 12/2005 | Oner et al. |
| 7,076,578 | B2 | 7/2006 | Poisner et al. |
| 7,218,566 | B1 | 5/2007 | Totolos, Jr. et al. |
| 2003/0172208 | A1* | 9/2003 | Fidler ................. 710/52 |
| 2004/0034718 | A1 | 2/2004 | Goldenberg et al. |
| 2004/0187122 | A1 | 9/2004 | Gosalia et al. |
| 2005/0027902 | A1 | 2/2005 | King et al. |
| 2005/0108446 | A1* | 5/2005 | Inogai ................. 710/20 |
| 2007/0073915 | A1 | 3/2007 | Go et al. |
| 2007/0074091 | A1 | 3/2007 | Go et al. |
| 2007/0079185 | A1 | 4/2007 | Totolos |
| 2007/0204091 | A1* | 8/2007 | Hofmann et al. ....... 710/308 |

FOREIGN PATENT DOCUMENTS

CN    1794214 A    6/2006

OTHER PUBLICATIONS

U.S. Appl. No. 11/621,776, filed Jan. 10, 2007, Biran et al.
U.S. Appl. No. 11/621,789, filed Jan. 10, 2007, Biran et al.

* cited by examiner

*Primary Examiner*—Niketa I Patel
(74) *Attorney, Agent, or Firm*—Stephen R. Tkacs; Stephen J. Walder, Jr.; Matthew B. Talpis (57) ABSTRACT

A direct memory access (DMA) device is structured as a loosely coupled DMA engine (DE) and a bus engine (BE). The DE breaks the programmed data block moves into separate transactions, interprets the scatter/gather descriptors, and arbitrates among channels. The DE and BE use a combined read-write (RW) command that can be queued between the DE and the BE. The bus engine (BE) has two read queues and a write queue. The first read queue is for "new reads" and the second read queue is for "old reads," which are reads that have been retried on the bus at least once. The BE gives absolute priority to new reads, and still avoids deadlock situations.

16 Claims, 5 Drawing Sheets

METHOD FOR PERFORMING A DIRECT MEMORY ACCESS BLOCK MOVE IN A DIRECT MEMORY ACCESS DEVICE

BACKGROUND

1. Technical Field

The present application relates generally to an improved data processing system and method. More specifically, the present application is directed to a direct memory access controller with support for high latency devices.

2. Description of Related Art

Many system-on-a-chip (SOC) designs contain a device called a direct memory access (DMA) controller. The purpose of DMA is to efficiently move blocks of data from one location in memory to another. DMA controllers are usually used to move data between system memory and an input/output (I/O) device, but are also used to move data between one region in system memory and another. A DMA controller is called "direct" because a processor is not involved in moving the data.

Without a DMA controller, data blocks may be moved by having a processor copy data piece-by-piece from one memory space to another under software control. This usually is not preferable for large blocks of data. Having a processor copy large blocks of data piece-by-piece is slow, because the processor does not have large memory buffers and must move data in small inefficient sizes, such as 32-bits at a time. Also, while the processor is doing the copy, it is not free to do other work. Therefore, the processor is tied up until the move is completed. It is far better to offload these data block moves to a DMA controller, which can do them much faster and in parallel with other work.

DMA controllers usually have multiple "channels." Thus, DMA controllers may be programmed to perform several block moves on different channels simultaneously, allowing the DMA device to transfer data to or from several I/O devices at the same time.

Another feature that is typical of DMA controllers is a "scatter/gather" feature. When executing a scatter/gather operation, the DMA controller does not need to be programmed by the processor for each block. Rather, the processor sets up a "descriptor table" or "descriptor linked list" in memory, depending on the scatter/gather architecture. Each descriptor describes a data block move, including source address, destination address, and number of bytes to transfer. Non-scatter/gather block moves, which are programmed via the DMA registers directly, are referred to as "single programming" DMA block moves.

The linked list architecture is flexible and dynamic compared to the table architecture. In the linked list architecture, the processor refers one of the DMA channels to the first descriptor in the chain, and each descriptor in the linked list contains a pointer to the next descriptor in memory. The descriptors may be anywhere in memory, and the processor may add onto the list dynamically as the transfers are occurring. The DMA controller automatically traverses the table or list and executes the data block moves described by each descriptor until the end of the table or list is reached.

High latency devices present unique challenges if high bus utilization is desired. Each bus has a maximum sustained bandwidth that can be achieved if it is transferring data most of the time without gaps or stalls. When talking to a high latency device, there must be enough simultaneous transactions outstanding so that the time it takes to receive data from the high latency device is less than or equal to the amount of time it takes to transfer the data from all of the other outstanding transactions queued ahead of it. If this criterion is met, then there seldom will be gaps or stalls on the bus where the DMA is waiting for data and does not have any other data available to transfer.

Many busses and interconnects are not able to process 16 or more outstanding read transactions per master, but most busses do have a simple "retry" mechanism. Retry is a response given by the target that tells the master to repeat the same transaction at a later time because the target cannot complete the transaction at that time.

A "delayed read" is a method that high latency targets use to improve bus utilization by not stalling the bus while they are fetching high latency data. A target typically has the option to insert wait states into a transaction to delay the completion of that transaction until it can return the data. Wait states are very inefficient for high latency targets because such targets have to insert many wait states per transaction, and while the bus is in wait states, no other transactions from any masters to any targets can run. The bus is stalled. The delayed read avoids stalling the bus for high latency reads.

A delayed read works as follows. When a high latency target receives a new read request, it will retry that request and at the same time queue the transaction and begin processing it. The retry immediately frees up the bus and allows the bus arbiter to allow the next transaction from the same or a different master to run. When the target has queued a read, that read becomes pending. If the master comes back with the repeated transaction before the target has the data available for return, the target retries the transaction again and the read remains pending.

When the master comes back with the repeated transaction and the target does have the requested data queued and ready to return, the target accepts the transaction and immediately returns the data. Delayed reads allow the target to queue as many transactions as it is designed to handle simultaneously regardless of how many outstanding transactions the bus supports. The bus does not have any knowledge of how many transactions are queued inside the target. Thus, delayed reads are a good way to queue lots of simultaneous transactions on any given bus.

SUMMARY

The illustrative embodiments recognize the disadvantages of the prior art and provide a direct memory access device that is structured as a loosely coupled direct memory access engine and a bus engine. The direct memory access engine breaks the programmed data block moves into separate transactions, interprets the scatter/gather descriptors, and arbitrates among channels. The bus engine understands the bus protocol of the bus to which the direct memory access device is attached and runs all of the transactions sent by the direct memory access engine. The direct memory access engine and bus engine make the process more efficient by using a combined read-write (RW) command that can be queued between the direct memory access engine and the bus engine. The bus engine has two read queues and a write queue. The first read queue is for "new reads" and the second read queue is for "old reads," which are reads that have been retried on the bus at lest once. The bus engine gives the highest priority to new reads, because they are high latency. This mechanism provides a way to give absolute priority to new reads, and still avoids deadlock situations.

In one illustrative embodiment, a method is provided for performing a direct memory access block move in a direct memory access device. The method comprises receiving, at a direct memory access engine within the direct memory access device, a direct memory access block move request, wherein the direct memory access block move request indicates a source and a target. The method further comprises issuing one or more read-write commands for the direct memory access block move request from the direct memory access engine to a bus engine within the direct memory access device. The method further comprises performing, by the bus engine, a read operation to read data from the source and a write operation to write the data to the target for each of the one or more read-write commands to satisfy the direct memory access block move request.

In one exemplary embodiment, each read-write command within the one or more read-write commands comprises a source address, a destination address, and a byte count. In another exemplary embodiment, the byte count corresponds to a buffer size of the bus engine.

In another exemplary embodiment, the method comprises returning an acknowledge to the direct memory access engine if buffer space within the bus engine is not full responsive to receiving a given read-write command at the bus engine. In a further exemplary embodiment, the method further comprises withholding an acknowledge to the direct memory access engine if buffer space within the bus engine is full responsive to receiving the given read-write command at the bus engine, and responsive to buffer space becoming available in the bus engine, returning the acknowledge to the direct memory access engine. The direct memory access engine does not issue a subsequent read-write command until the acknowledge is received at the direct memory access engine.

In a further exemplary embodiment, performing the read operation and the write operation comprises placing a read transaction associated with a given read-write command in a new read queue within the bus engine. In a still further exemplary embodiment, performing the read operation and the write operation further comprises running a read transaction from the new read queue, determining whether the read transaction is retried, and if the read transaction is not retried, placing a write transaction associated with the read-write command in a write queue within the bus engine. In yet another exemplary embodiment, performing the read operation and the write operation further comprises placing the read transaction in an old read queue if the read transaction is retried.

In another illustrative embodiment, a data processing system comprises a bus, a plurality of bus unit devices coupled to the bus, a direct memory access device coupled to the bus, and a processing unit. The direct memory access device comprises a direct memory access engine and a bus engine. The processing unit has access to the bus. The direct memory access engine receives a direct memory access block move request from the processing unit. The direct memory access block move request indicates a source device and a target device within the plurality of bus unit devices. The direct memory access engine issues one or more read-write commands for the direct memory access block move request to the bus engine. The bus engine performs a read operation to read data from the source device and a write operation to write data to the target device for each of the one or more read-write commands to satisfy the direct memory access block move request.

In other exemplary embodiments, the data processing system performs various ones of the operations outlined above with regard to the method in the illustrative embodiments.

In a further illustrative embodiment, a south bridge comprises a bus and a direct memory access device coupled to the bus. The direct memory access device comprises a direct memory access engine and a bus engine. A processing unit has access to the bus. The direct memory access engine receives a direct memory access block move request from the processing unit. The direct memory access block move request indicates a source device and a target device connected to the bus. The direct memory access engine issues one or more read-write commands for the direct memory access block move request to the bus engine. The bus engine performs a read operation to read data from the source device and a write operation to write data to the target device for each of the one or more read-write commands to satisfy the direct memory access block move request.

In other exemplary embodiments, the south bridge performs various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
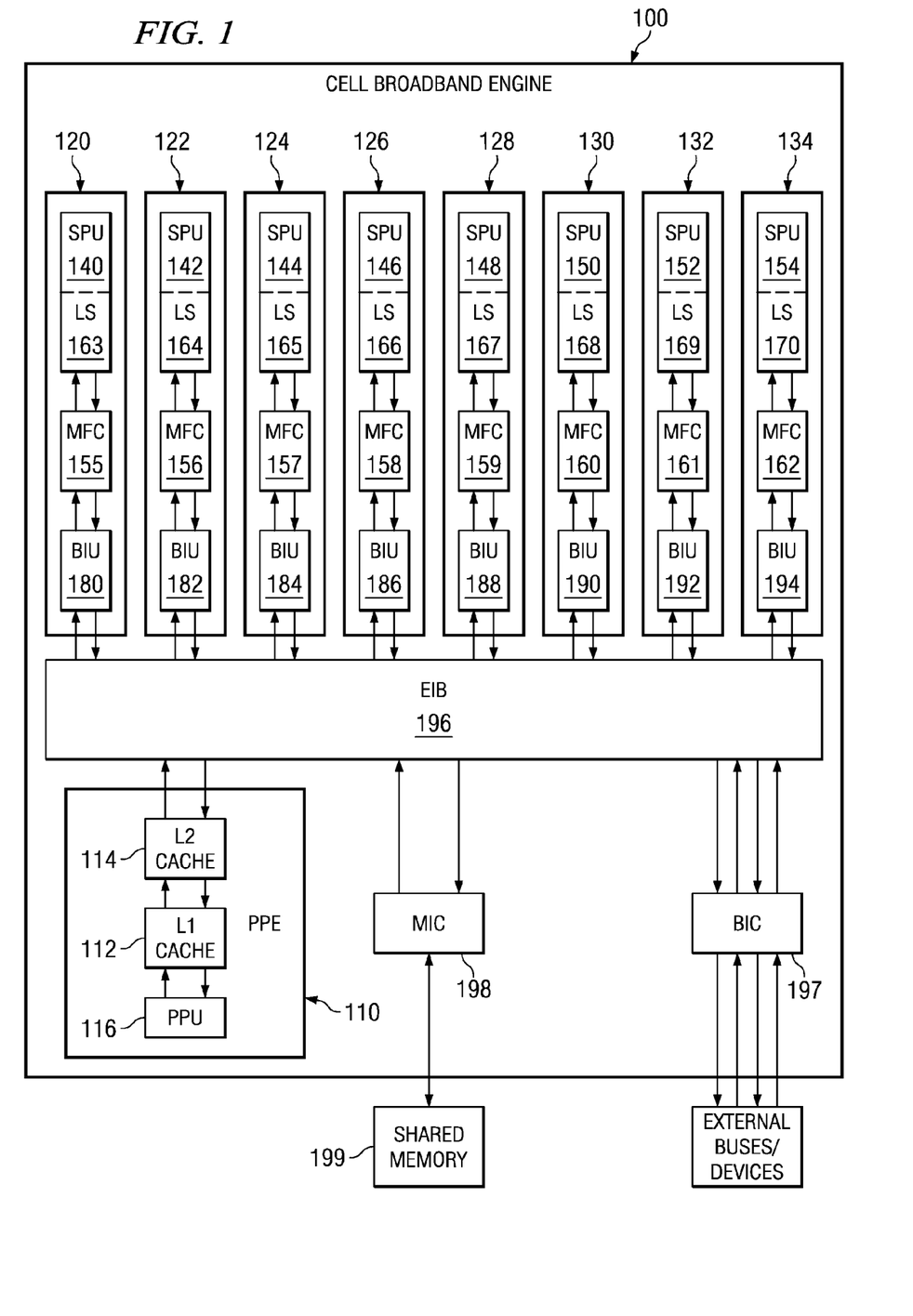
FIG. 1 is an exemplary block diagram of a data processing system in which aspects of the illustrative embodiments may be implemented.
Figure 2:
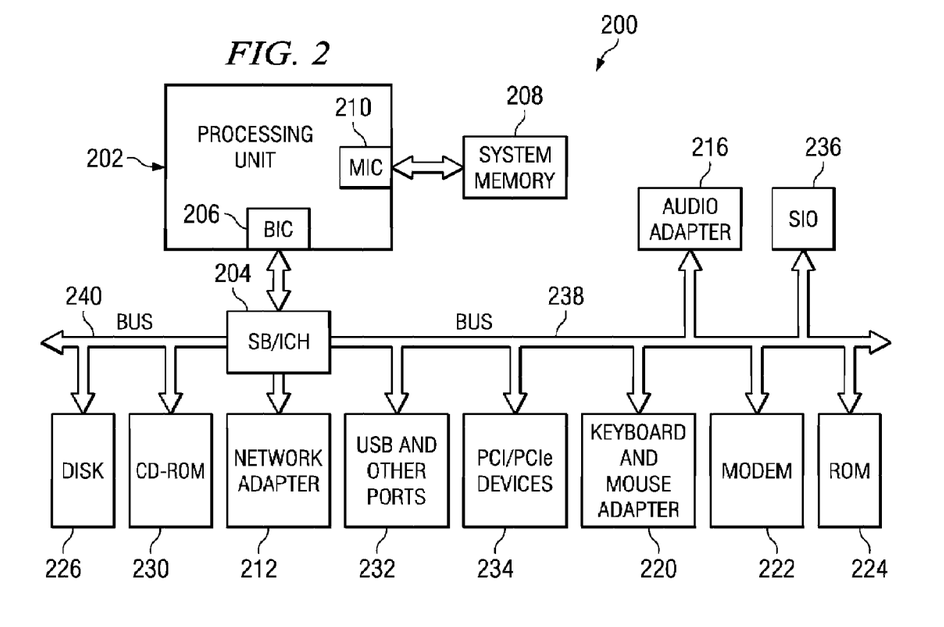
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is an exemplary block diagram of a data processing system in which aspects of the illustrative embodiments may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read-write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCS) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With reference now to FIG. 2, a block diagram of an exemplary data processing system is shown in which aspects of the illustrative embodiments may be implemented. In the depicted example, data processing system 200 employs a hub architecture including south bridge and input/output (I/O) controller hub (SB/ICH) 204. Processing unit 202 is connected to system memory 208 via memory interface controller (MIC) 210. Processing unit 202 is connected to SB/ICH 204 through bus interface controller (BIC) 206.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 202. The operating system coordinates and provides control of various components within the data processing system 200 in FIG. 2. As a client, the operating system may be a commercially available operating system. An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both, while LINUX is a trademark of Linus Torvalds in the United States, other countries, or both). Data processing system 200 may include a plurality of processors in processing unit 202. Alternatively, a single processor system may be employed.

Instructions for the operating system, the object-oriented programming system, and applications or programs are located on storage devices, such as HDD 226, and may be loaded into main memory 208 for execution by processing unit 202. The processes for illustrative embodiments of the present invention may be performed by processing unit 202 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), video game console, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

South bridge 204 may include a direct memory access (DMA) controller. DMA controllers are usually used to move data between system memory and an input/output (I/O) device, but are also used to move data between one region in system memory and another. High latency devices present unique challenges if high bus utilization is desired. When talking to a high latency device, there must be enough simultaneous transactions outstanding so that the time it takes to receive data from the high latency device is less than or equal to the amount of time it takes to transfer the data from all of the other outstanding transactions queued ahead of it. If this criterion is met, then there seldom will be gaps or stalls on the bus where the DMA is waiting for data and does not have any other data available to transfer.

With trends towards further integration, particularly with systems-on-a-chip, many devices in FIG. 2 may be integrated within south bridge 204. For example, a single bus may be integrated within south bridge 204. Also, controllers and interfaces, such as USB controller, PCI and PCIe controllers, memory controllers, and the like, may be integrated within south bridge 204 and attached to the internal bus. Furthermore, south bridge 204 may include a memory controller to which a memory module may be connected for local memory. Also note that processing unit 202 may include an internal bus, such as EIB 196 in FIG. 1, through which the DMA device may access system memory 208.

Figure 3:
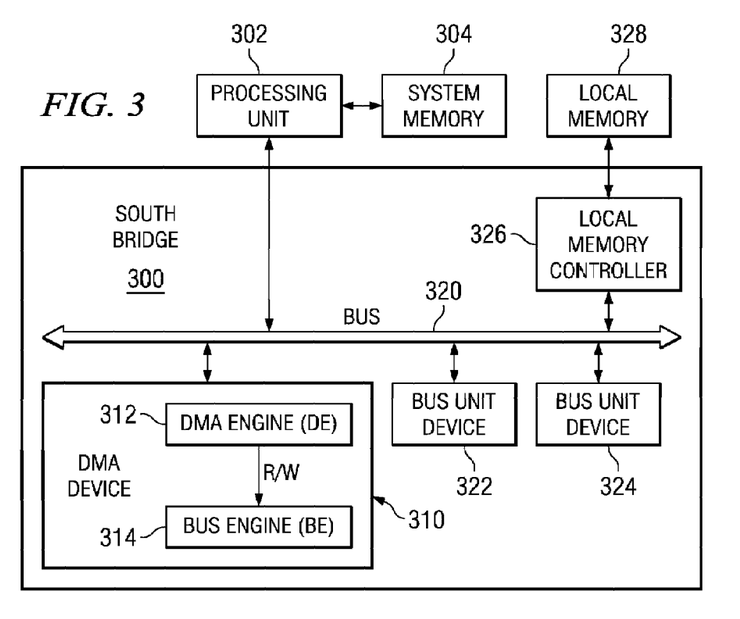
FIG. 3 is a block diagram illustrating a south bridge in accordance with an illustrative embodiment.

FIG. 3 is a block diagram illustrating a south bridge in accordance with an illustrative embodiment. Processing unit 302, for example, issues DMA commands to bus 320 in south bridge 300. DMA device 310 within south bridge 300 may then execute the DMA commands by performing read operations from source devices, such as bus unit device 322, and write operations to target devices, such as bus unit device 324. In an alternative example, a DMA command may request to move a block of data from bus unit device 322 to system memory 304, or according to yet another example, a DMA command may request to move a block of data from memory 304 to bus unit device 324. Bus unit device 322 and bus unit device 324 may be, for example, memory controllers, USB controllers, PCI controllers, storage device controllers, and the like, or combinations thereof.

The source devices and target devices may include low latency, such as memory, and high latency devices, such as hard disk drives. Note, however, that devices that are generally low latency, such as memory devices, may also be high latency in some instances. Many of the components of south bridge 300 are not shown for simplicity. A person of ordinary skill in the art will recognize that south bridge 300 will include many more features and functions not illustrated in FIG. 3.

In south bridge 300, DMA device 310 comprises DMA engine (DE) 312 and bus engine (BE) 314. A specialized read-write (RW) command allows DE 312 to more efficiently queue transactions to BE 314. Using a more standard implementation, the DE would micromanage the BE by specifying every transaction that the BE is to execute on the bus. However, in the illustrative embodiment, the specialized RW command allows DE 312 to specify both a read and a write at the same time so that DE 312 can more efficiently control the moving of data blocks.

BE 314 may read the DMA commands, such as block move requests, issued from processing unit 302 to bus 320. Processing unit 302 may issue DMA commands directly to DMA device 310. Alternatively, processing unit 302 may issue DMA commands using a scatter/gather list, which may be a table or linked list in system memory 304. In the latter case, BE 314 may simply read a descriptor from the scatter/gather list to receive the next DMA command. DMA device 310 may use local memory 328, connected through local memory controller 326, as a working memory. For instance, DMA device 310 may use local memory 328 to buffer reads and writes.

In accordance with an illustrative embodiment, as illustrated in FIG. 3, for example, a DMA device is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The BE must support enough simultaneous transactions, and, thus, enough buffers, to keep the pipeline of data flow from stalling. The DE queues transactions to the BE and can get far ahead of the BE per the BE's buffer space. The BE throttles the DE via simple request/acknowledge handshaking.

The DE does not know, or need to know, how many buffers the BE has implemented; therefore, different BEs can be used with the same DE to support different latency environments or to attach to different busses. For maximum scalability, the BE may be constructed as logically independent "BE units," each responsible for managing one buffer and one transaction for the DE. The number of BE units may be a configurable synthesis parameter.

As long as the DE gets an acknowledge for its current request, it can make another request. When the BE is out of available buffers, it withholds the acknowledge of the DE's current request, which prevents the DE from requesting any more transactions. When resources free up in the BE, it will activate the acknowledge to the DE, and then the DE can request another transaction.

The BE contains a general pool of buffers. For example, if the BE contains 16 buffers, all 16 may be used by one DMA channel, or they may be allocated any way the DE needs them between the channels. The DE queues transactions from any of the channels to the BE. The DE only stops queuing transactions when it has no more work to do or when the BE withholds the acknowledge indicating that it is out of available buffer space.

The BE runs all the queued transactions according to the bus protocol and handles possible bus situations, such as transaction data coming back out of order and retried transactions. A DMA that handles out of order data is optimized for data block moves for which there is no meaning to the order of the sub-blocks. There are some applications like networking and video stream transport where the data must be moved in order.

There may be a simple interface between the DE and the BE in which the DE queues transactions to the BE. The BE runs the transactions for the DE until the DE has caused all programmed data blocks to be moved. A DE may cause all of the data blocks to be moved by specifying each read and each write to the BE, which performs those reads and writes on the bus. The DE arbitrates among the channels and usually interleaves reads and writes from the various channels in a fair way so that data from all of the channels can transfer more or less simultaneously. There are various channel arbitration priority schemes that can be implemented; however, arbitration is not a focus of this disclosure.

Because a DMA involves moving data, each read transaction that the DE performs from the source address must eventually be followed by a corresponding write transaction to a destination address. And because the DMA moves data rather than processing data, the data that was transferred by the read transaction is the same data that is transferred by the corresponding write transaction. The data is not modified in any way. Therefore, in accordance with an illustrative embodiment, the DE and BE make the process more efficient by using a combined read-write (RW) command that can be queued between the DE and the BE.

An RW transaction specifies both a read and a corresponding write at the same time. When the DE queues a RW transaction to the BE, it specifies a source address, a destination address, and a byte count versus just a single address and a byte count as with a traditional read or write transaction. The RW command simplifies the architecture of the DE, because the DE does not have to manage both a read and a write phase for each transaction it queues. Rather, the DE simply queues a single RW transaction and can then "forget" about that transaction. The BE runs a separate read and write for each RW transaction queued by the DE.

Besides design simplification of the DE, this architecture is faster than the traditional architecture. In the traditional architecture, for each transaction of a data block move, the DMA engine queues a read waits for the read to complete. Then, the DME engine queues the corresponding write. The RW transaction architecture of the illustrative embodiment eliminates communication from the BE to notify the DE that the read is done and the communication from the DE to the BE to queue the corresponding write. The elimination of this communication saves at least two clock cycles per transaction.

The architecture of the BE can also be simplified in this architecture with the RW command. Instead of implementing separate read and write queues, a single transaction queue may be used. This architecture also saves attribute space in the DE, because the DE does not need to have space to store addresses for the number of channels times the number of buffers while waiting for the read data to come back. As an example, a DE may require 64 addresses in a 16-buffer, 4-channel DMA controller. The BE only has to store the read and write addresses for the buffers that it contains.

With separate read and write commands, attributes must be saved for each possible transaction queued by the DE to the BE; thus, it would be difficult to use different BEs with the same DE because the amount of attribute space that the DE must have depends directly on the number of buffers inside the BE. In the RW transaction architecture of the illustrative embodiment, the DE "forgets" about each transaction as soon as it is acknowledged by the BE so the architecture and resources inside of the DE do not depend on how many buffers are supported by the BE. This allows different BEs with different numbers of buffers and, thus, area resources to be used with the same DE. The number of buffers can depend on the expected latency of the devices in each system-on-a-chip (SOC).

While the DE does not know how many buffers the BE has, the DE may know the buffer size implemented in the BE. The DE may make "buffer sized" requests to the BE. Without taking the buffer size into consideration, the BE may become too complicated, because there would be nothing preventing the DE from requesting something that exceeds the total amount of BE buffer space.

In the architecture of the illustrative embodiment, the BE can run in "flow through" mode as long as the bus does not "pace" (insert wait states on) write data. This means that once the write request is acknowledged on the BE bus, the buffer immediately can be reused for the next read. Because the write data cannot be stopped, there can be read data flowing into one side of the buffer while write data flows out of the other side. This allows read and write data to be transferred in parallel to the same buffer without any chance that the read data will overwrite the write data.

With separate read and write commands, the DE must know about errors; therefore, the BE must update the error registers and inform the DE of whatever it needs to know about errors that occurred on the bus. It would be implementation dependent what a DE does when it finds out about an error on one of the transactions it has queued with separate read and write commands. One of the things the DE may be designed to do is to stop queuing any more transactions on the current channel until the error is processed by software. In architecture of the illustrative embodiment with the RW command, because the DE forgets about each RW transaction once the transaction is queued, it becomes the responsibility of the BE to handle any errors that occur on the bus as a result of executing the read and associated write of an RW transaction.

A "delayed read" is a method that high latency targets use to improve bus utilization by not stalling the bus while they are fetching high latency data. A target typically has the option to insert wait states into a transaction to delay the completion of that transaction until it can return the data. Wait states are very inefficient for high latency targets because such targets have to insert many wait states per transaction, and while the bus is in wait states, no other transactions from any masters to any targets can run.

Target directed completion (TDC) is an enhancement to delayed reads. A target that supports TDC captures the tag of the transaction along with the address. The target has a read mask signal associated with each tag it can receive. If the bus allows for 16 different read tags, then each TDC target has a read mask bus. When a TDC target queues a read, it asserts the read mask signal that corresponds to the tag of the read. As long as the read mask is asserted for a tag, the master knows not to repeat that read. When the target is ready to deliver the data for that read, it deasserts the read mask signal. The master may then repeat the transaction, and the transaction is completed by the target.

The read mask signals from all of the targets may be ORed together to form a single read mask that is provided to the master. This may be done because a master cannot have more than one read transaction outstanding on the bus with the same tag. Only one target at a time will assert the read mask for a given tag to a given master.

TDC has two primary purposes. First, TDC is a way of avoiding unnecessary repeated transactions, whereby the master repeats transactions that have been retried and queued by a target, which is not yet ready to return the data. In a high latency environment, many wasted transactions can be avoided, saving bus bandwidth for productive work. Second, for targets that can queue many transactions (e.g., 16), TDC provides a way for the target to tell the master which of the transactions are available to be unloaded, and in what order they completed.

It would be very inefficient for the master to queue 16 transactions, for instance, to a target and then loop around those 16 transactions just to see which of the 16 transactions have completed and which have not. For example, suppose transaction 13 of 16 finishes first. The master would have to read tag 0, get retried, read tag 1, get retried, read tag 2, get retried, and so on until it finally gets to transaction 13, which is ready to unload data. TDC avoids a tremendous amount of wasted requests to targets that can queue many transactions. In addition, TDC allows the master to unload read data in the order that it becomes available for optimum fairness.

In one illustrative embodiment, the bus engine (BE) has two read queues and a write queue. The first read queue is for "new reads" and the second read queue is for "old reads," which are reads that have been retried on the bus at lest once. The BE gives the highest priority to new reads, because they are high latency. This mechanism provides a way to give absolute priority to new reads, and still avoids deadlock situations.

The three queues in this architecture are structured such that transactions move from the DE to the new read queue. Transactions for which the read was retried move to the old read queue. Transactions for which the read completes move to the write queue. The new read queue has absolute priority. After that, there is fair arbitration between the old read queue and the write queue. Within each queue, transactions are dispatched on a first-in, first-out (FIFO) basis.

This architecture has a performance advantage over other schemes that arbitrate more fairly among the different types of transactions. Other schemes implement a fairer arbitration to avoid deadlocks, but the addition of the second read queue eliminates the possibility of deadlock.

Figure 4:
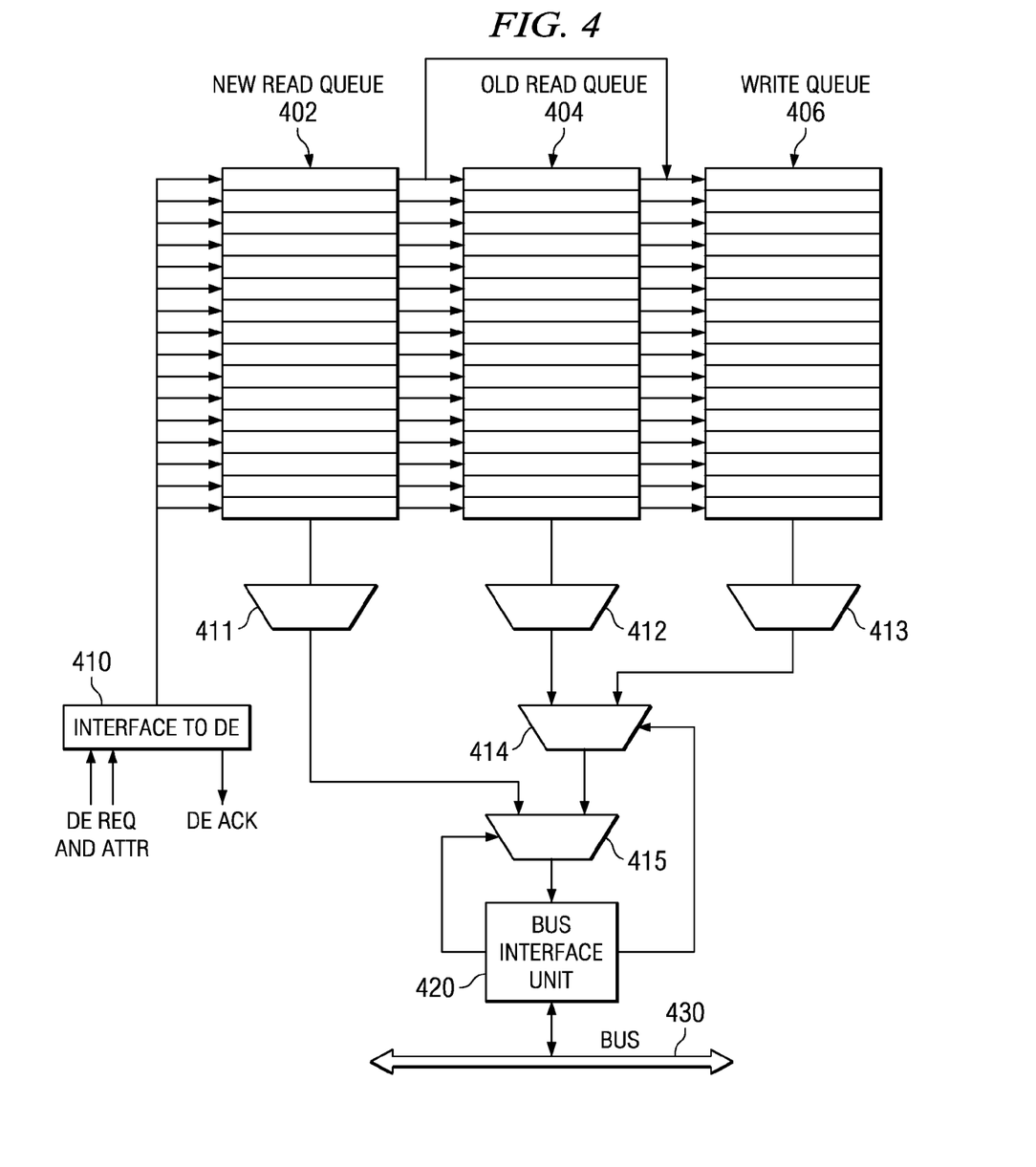
FIG. 4 illustrates an overall bus engine queue structure in accordance with an illustrative embodiment.

FIG. 4 illustrates an overall bus engine queue structure in accordance with an illustrative embodiment. Interface 410 receives RW commands from the DMA engine, and places these commands into new read queue 402. The DE queues transactions to the BE via a simple request/acknowledge handshake. The BE withholds the acknowledge when it has no more queue space.

Each DMA move consists of a read and a write. Therefore, each RW command begins as a new read in new read queue 402. New read queue 402 contains reads that have not yet been attempted on bus 430. Bus interface unit (BIU) 420 runs the reads in the order they are put into new read queue 402 via a FIFO mechanism to be described in further detail below. FIFO ordering applies to all of queues 402-406.

Multiplexer 411 selects a read from new read queue 402 to be run by bus interface unit 420. When BIU 420 runs a read from new read queue 402, there are two possible results. The read may complete immediately. This may happen, for example, for low latency targets that do not use the TDC mechanism and are able to accept the transaction right away. In this case, BIU 420 executes the read on bus 430. Upon completion of the read, the transaction is sent to write queue 406, bypassing old read queue 404.

The second result that may happen when a new read is run is that the read is retried. A read may be retried, for example, if the target device is busy. This applies to TDC and non-TDC devices. When a TDC device retries because it is busy, it does not assert the read mask signal. The retried busy transaction is then sent to old read queue 404 so that it is put in line to run again. Alternatively, a read may be retried if a TDC device has queued the transaction. When this occurs, the device retries the transaction and asserts the read mask signal corresponding to the tag. The queued transaction is held in new read queue until its associated read mask signal deasserts—its tag is not put back into the new read queue ordering FIFO. When the corresponding read mask signal deasserts, the read is sent from new read queue 404 to old read queue 404. This is how the TDC mechanism prevents the transaction from running again until the target says that the read data is available.

Multiplexer 412 selects a read from old read queue 404 to be run by bus interface unit 420. When BIU 420 runs a read from old read queue 404, there are two possible results. The read may complete immediately. This may happen for non-TDC targets that retried the read at least once before due to being busy, but are now able to accept the transaction. The read may also complete for TDC targets whose data is now available. In either case, the transaction is sent from old read queue 404 to write queue 406 upon completion.

The second thing that may happen when a read is run from old read queue 404 is that the read may be retried. This should only happen to non-TDC reads that have previously been retried, because once the read mask is deasserted by a TDC device, it should not retry the transaction again (however, this is not strictly required). If the old read is retried, it remains in the same location in old read queue 404, but its tag is sent back around to the beginning of the old read queue ordering FIFO to put it back in line to be run again, as will be described in further detail below.

Multiplexer 413 selects a write from write queue 406 to be run by bus interface unit 420. When BIU 420 runs a write from write queue 406, there are two possible results. The write may complete immediately. In this case, the transaction data move specified by that transaction is complete. As soon as the write is accepted (acknowledged) by bus 430 (i.e. even before the data has been transferred on busses that do not pace writes with wait states), the associated transaction tag is "deallocated" and can be reused for a new read. Another read using this tag may not be issued before this point, because the read and the corresponding write share a data buffer location. In fact, a given queue location points to the same data buffer location for all three queues.

The second thing that may happen when a write is run is that it is retried. This may happen because the target is busy or does not have available write buffers. If the write is retried, it remains in the same location in write queue 406, but its tag is sent back around to the beginning of the write queue ordering FIFO to put it back in line to be run again, as will be described in further detail below. Alternatively, the BE may simply repeat a retried write immediately rather than reloading it back into the ordering FIFO. This will not cause a deadlock, because the completion of a write cannot depend on the completion of other transactions except other writes ahead of it.

Multiplexer 415 selects among transactions from new read queue 402, old read queue 404, and write queue 406. Bus interface unit 420 gives new read queue 402 absolute priority; therefore, if a new read is available in new read queue 402, BIU 420 provides a selection signal to multiplexer 415 to select a transaction from multiplexer 411.

If a new read is not available in new read queue 402, BIU 402 provides a selection signal to multiplexer 415 to select a transaction from multiplexer 414. Multiplexer 414 selects between old read queue 404 and write queue 406. BIU 420 arbitrates fairly between old read queue 404 and write queue 406; therefore, when a new read is not available, BIU 420 provides a selection signal to multiplexer 414 to alternate between transactions from multiplexer 412 and transactions from multiplexer 413.

As stated above, BIU 420 gives absolute priority to new read queue 402. If there are any new reads in new read queue 402, they will all issue before any reads are issued from old read queue 404 or any writes are issued from write queue 406. In this manner, the DMA controller is optimized for high latency devices, as it is imperative to start those devices working on their data fetches as soon as possible.

While the high latency devices are working on their fetches, writes and old reads, which complete comparatively quickly, can be processed by the DMA controller. This achieves the most amount of parallelism because the DMA controller can work on what it can complete (writes and old reads) while the high latency devices work on their high latency reads. When there are no more new reads pending, but BIU 420 considers writes and old reads, the arbitration mechanism of BIU 420 arbitrates fairly between old reads and writes. Fair arbitration is implemented because old reads and writes are equally important to process. Processing TDC reads that are "ready" and processing writes both move data through the pipeline to eventually free up tags so that more new reads may be queued.

When an arbitration scheme gives absolute priority to any class of transactions, deadlocks and starvation may be a concern. Here, the BIU gives absolute priority to new reads. Generally, deadlocks may occur when one transaction cannot complete (i.e. a transaction is continuously retried) because some other transaction must complete first, but that other transaction cannot complete because the first transaction is in a transaction class with absolute priority. The second "freeing" transaction is in a transaction class of a lower priority, which is not able to run.

The architecture of the illustrative embodiment is guaranteed not to deadlock, because a given transaction can only be in the new read queue one time. If that transaction is retried, either queued or not queued, it is now considered an old read, and old reads are fairly arbitrated with writes and other old reads. Therefore, if one of those other transactions is what caused the new read to be retried, that transaction will have an opportunity to run and free up the dependency.

The architecture of the illustrative embodiment will also not experience starvation of old read queue 404 or write queue 406 due to a steady stream of new reads that have absolute priority. This is because once a read leaves new read queue 402 to go to old read queue 404 or write queue 406, another new read cannot take its place at the same location in the new read queue until the write for that transaction is started. This guarantees that the new read queue cannot starve out the other queues, because a transaction cannot be replaced in new read queue 402 until it has been processed by write queue 406.

Figure 5:
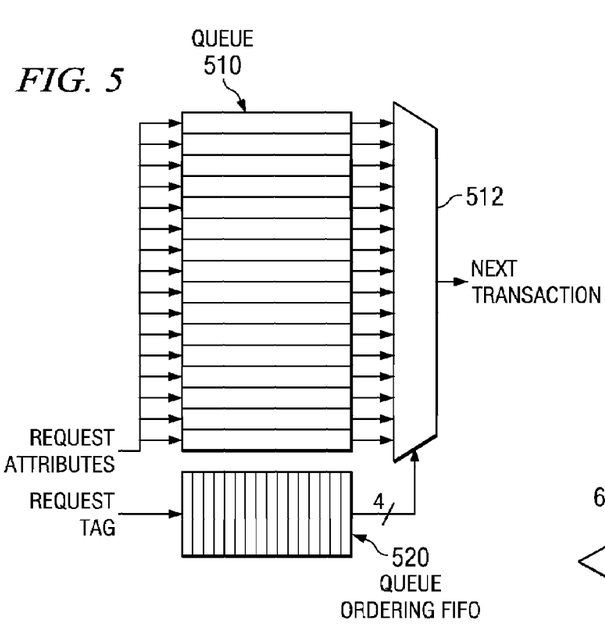
FIG. 5 illustrates inter-queue ordering for a queue within the bus engine in accordance with an illustrative embodiment.

FIG. 5 illustrates inter-queue ordering for a queue within the bus engine in accordance with an illustrative embodiment. The bus engine assigns a tag to each request transaction. This tag may be the same as the transaction tag number that is used on the bus. The transaction is loaded into queue 510 at a location corresponding to the request tag. For example, a transaction with TAG=5 is loaded into location 5 in queue 510.

At the same time that the BE loads queue 510 with the request attributes of the transaction, the BE places the request tag into queue ordering FIFO 520. Queue ordering FIFO 520 is used to keep track of the order that transactions are put into queue 510. The request tags "pop" off of the bottom of queue ordering FIFO 520 in the order in which they were queued. The output of queue ordering FIFO 520 is used to select the corresponding transaction from queue 510 by providing a selection signal to multiplexer 512.

Figure 6:
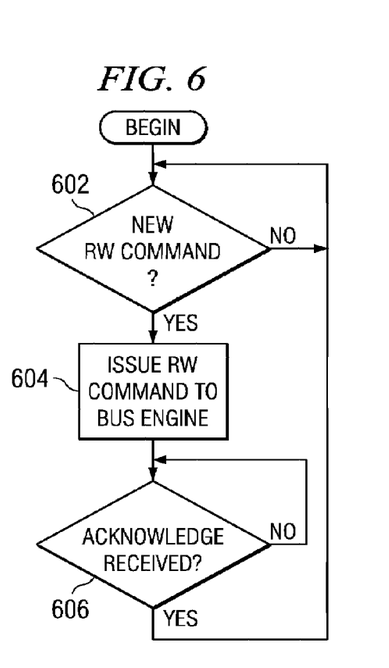
FIG. 6 is a flowchart illustrating the operation of a direct memory access engine issuing read-write commands in accordance with an illustrative embodiment.

FIG. 6 is a flowchart illustrating the operation of a direct memory access engine issuing read-write commands in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 6, operation begins and the direct memory access (DMA) engine (DE) determines whether a new read-write (RW) command is ready to issue to the bus engine (BE) (block 602). If a new RW command is not ready, operation returns to block 602 to wait until a RW command is ready.

If a new RW command is ready in block 602, the DE issues the RW command to the BE (block 604). Thereafter, the DE determines whether an acknowledge is received for the current command (block 606). If the DE determines that it has received an acknowledge for the current command, then operation returns to block 602 to determine whether a new RW command is ready to be issued.

If the DE determines that it has not received an acknowledge in block 606, operation returns to block 606 to wait until an acknowledge is received. As long as the DE gets an acknowledge for its current request, it can make another request. When the BE is out of available buffers, it withholds the acknowledge of the DE's current request, which prevents the DE from requesting any more transactions. When resources free up in the BE, it will activate the acknowledge to the DE, and then the DE can request another transaction.

Figure 7A:
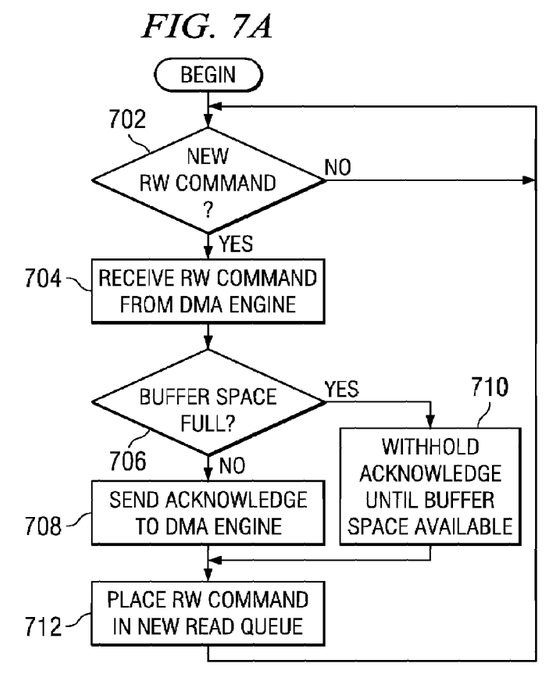
FIGS. 7A and 7B are flowcharts illustrating the operation of a bus engine in a direct memory access device in accordance with illustrative embodiments.
Figure 7B:
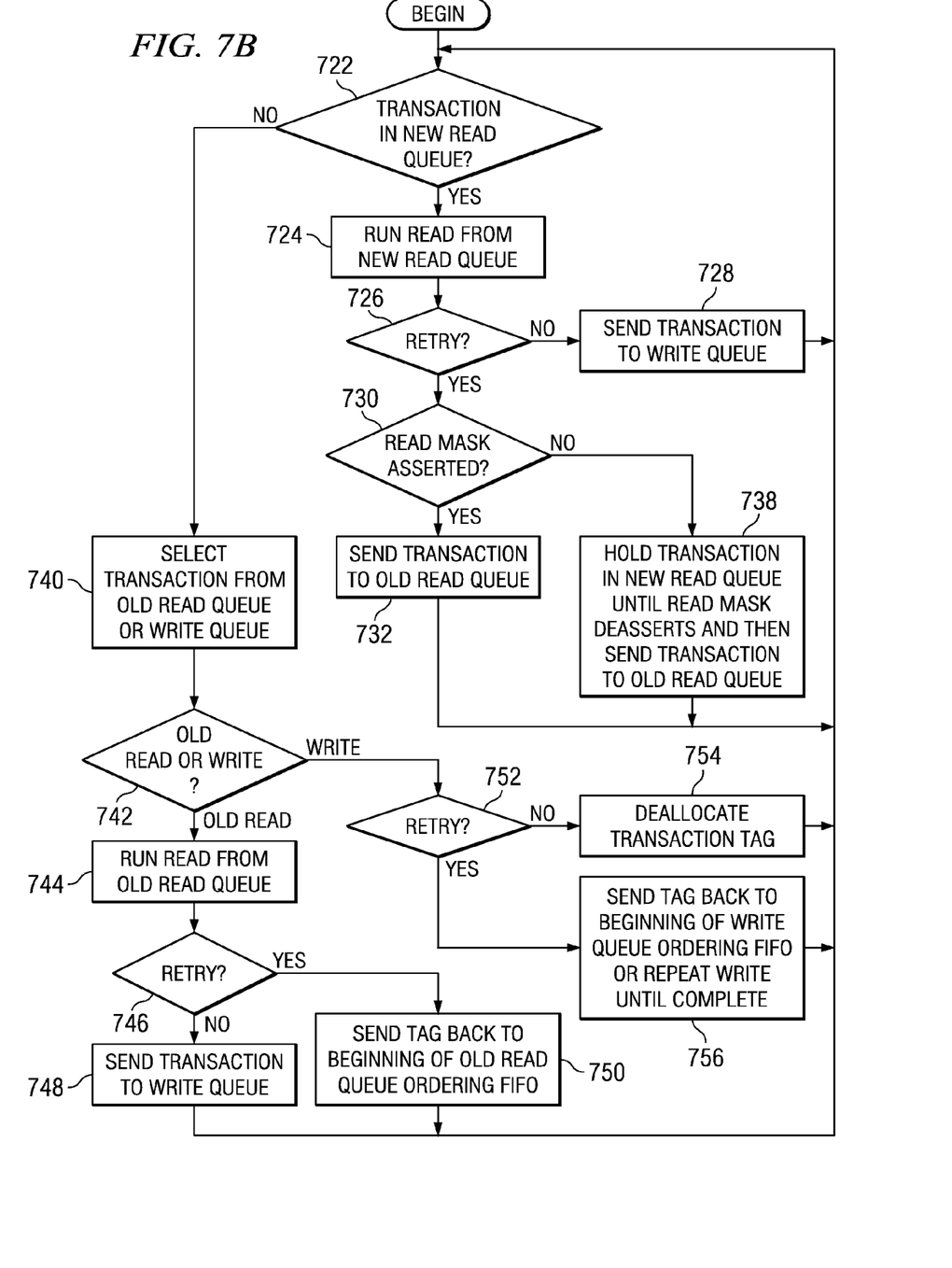

FIGS. 7A and 7B are flowcharts illustrating the operation of a bus engine in a direct memory access device in accordance with illustrative embodiments. More particularly, with reference to FIG. 7A, a flowchart is shown illustrating the operation of a bus engine (BE) receiving read-write (RW) commands from a DMA engine (DE) in accordance with an illustrative embodiment. Operation begins and the BE determines whether a new RW command being issued from the DE (block 702). If a new RW command is not being issued, operation returns to block 702 to wait until a new RW is being issued.

If a new RW command is being issued from the DE in block 702, the BE receives the RW command from the DE (block 704). The BE then determines whether buffer space is full (block 706). If buffer space is not full, the BE sends an acknowledge to the DE; otherwise, the BE withholds the acknowledge until buffers space is available (block 710). Thereafter, the BE places the RW command in the new read queue (block 712), and operation returns to block 702 to determine whether a new RW command is being issued from the DE.

FIG. 7B is a flowchart illustrating the operation of inter-queue ordering for a bus engine (BE) in a DMA device in accordance with an illustrative embodiment. Operation begins and the BE determines whether a transaction exists in the new read queue (block 722). If a new read exists, the BE runs the next read from the new read queue (block 724). Next, the BE determines whether the read results in a retry (block 726). If the read does not result in a retry, meaning the read completes immediately, the BE sends the transaction to the write queue (block 728). Thereafter, operation returns to block 722 to determine whether a transaction exists in the new read queue.

If the read results in a retry in block 726, the BE determines whether the retry is because the target device queued the read (by asserting the read mask signal) or because the target device is busy and thus asserted retry without asserting read mask (block 730). If the retry is because the target device is busy (read_mask not asserted), the BE sends the transaction to the old read queue (block 732), and operation returns to block 722 to determine whether a transaction exists in the new read queue. If read mask is asserted with the retry, a TDC device has queued the transaction, then the BE holds the transaction in the new read queue until the read mask deasserts, and then sends the transaction to the old read queue (block 738). Thereafter, operation returns to block 722 to determine whether a transaction exists in the new read queue.

Returning to block 722, if a transaction does not exist in the new read queue, the BE selects a transaction from the old read queue or the write queue using fair arbitration (block 740). Next, the BE determines whether the transaction is an old read or a write (block 742). If the transaction is an old read, the BE runs the read selected from the old read queue (block 744). The BE determines whether the read results in a retry (block 746). If the read does not result in a retry, the BE sends the transaction to the write queue (block 748); otherwise, the BE sends the request tag for the transaction back to the beginning of the old read queue ordering FIFO (block 750). Thereafter, operation returns to block 722 to determine whether a transaction exists in the new read queue.

If the transaction is a write in block 742, the BE determines whether the write results in a retry (block 752). If the write does not result in a retry, the BE deallocates the transaction tag (block 754), and operation returns to block 722 to determine whether a transaction exists in the new read queue. If the write does result in a retry in block 752, the BE sends the request tag, or transaction tag, back to the beginning of the write queue ordering FIFO to be retried (block 756). Alternatively, in block 756, the BE may repeat the write until the write completes successfully. Thereafter, operation returns to block 722 to determine whether a transaction exists in the new read queue.

Thus, the illustrative embodiments solve the disadvantages of the prior art by providing a DMA device that is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The DE and BE make the process more efficient by using a combined read-write (RW) command that can be queued between the DE and the BE. The bus engine (BE) has two read queues and a write queue. The first read queue is for "new reads" and the second read queue is for "old reads," which are reads that have been retried on the bus at lest once. The BE gives the highest priority to new reads, because they are high latency. This mechanism provides a way to give absolute priority to new reads, and still avoids deadlock situations.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing a direct memory access block move in a direct memory access device, the method comprising:
   receiving, at a direct memory access engine within the direct memory access device, a direct memory access block move request, wherein the direct memory access block move request indicates a source and a target;
   issuing one or more read-write commands for the direct memory access block move request from the direct memory access engine to a bus engine within the direct memory access device;
   performing, by the bus engine, a read operation to read data from the source and a write operation to write the data to the target for each of the one or more read-write commands to satisfy the direct memory access block move request;
   responsive to receiving a given read-write command at the bus engine, returning an acknowledge to the direct memory access engine if buffer space within the bus engine is not full;
   responsive to receiving the given read-write command at the bus engine, withholding an acknowledge to the direct memory access engine if buffer space within the bus engine is full; and
   responsive to buffer space becoming available in the bus engine, returning the acknowledge to the direct memory access engine, wherein the direct memory access engine does not issue a subsequent read-write command until the acknowledge is received at the direct memory access engine.

2. The method of claim 1, wherein each read-write command within the one or more read-write commands comprises a source address, a destination address, and a byte count.

3. The method of claim 2, wherein for a given read-write command the byte count corresponds to a buffer size of the bus engine.

4. The method of claim 1, wherein performing the read operation and the write operation comprises:
   placing a read transaction associated with a given read-write command in a new read queue within the bus engine.

5. The method of claim 4, wherein performing the read operation and the write operation further comprises:
   running a read transaction from the new read queue; determining whether the read transaction is retried; and
   if the read transaction is not retried, placing a write transaction associated with the read-write command in a write queue within the bus engine.

6. The method of claim 5, wherein performing the read operation and the write operation further comprises:
   if the read transaction is retried, placing the read transaction in an old read queue.

7. A method for performing a direct memory access block move in a direct memory access device, the method comprising:
   receiving, at a direct memory access engine within the direct memory access device, a direct memory access block move request, wherein the direct memory access block move request indicates a source and a target;
   issuing one or more read-write commands for the direct memory access block move request from the direct memory access engine to a bus engine within the direct memory access device;
   responsive to receiving a given read-write command at the bus engine, with holding an acknowledge to the direct memory access engine if buffer space within the bus engine is full;
   responsive to buffer space becoming available in the bus engine, returning the acknowledge to the direct memory access engine, wherein the direct memory access engine does not issue a subsequent read-write command until the acknowledge is received at the direct memory access engine; and
   performing, by the bus engine, a read operation to read data from the source and a write operation to write the data to the target for each of the one or more read-write commands to satisfy the direct memory access block move request.

8. The method of claim 7, wherein each read-write command within the one or more read-write commands comprises a source address, a destination address, and a byte count.

9. The method of claim 8, wherein for a given read-write command the byte count corresponds to a butler size of the bus engine.

10. The method of claim 7, wherein performing the read operation and the write operation comprises:
    placing a read transaction associated with a given read-write command in a new read queue within the bus engine.

11. The method of claim 10, wherein performing the read operation and the write operation further comprises:
    running a read transaction from the new read queue;
    determining whether the read transaction is retried; and
    if the read transaction is not retried, placing a write transaction associated with the read-write command in a write queue within the bus engine.

12. The method of claim 11, wherein performing the read operation and the write operation further comprises: if the read transaction is retried, placing the read transaction in an old read queue.

13. A method for performing a direct memory access block move in a direct memory access device, the method comprising:
    receiving, at a direct memory access engine within the direct memory access device, a direct memory access block move request, wherein the direct memory access block move request indicates a source and a target;
    issuing one or more read-write commands for the direct memory access block move request from the direct memory access engine to a bus engine within the direct memory access device;
    performing, by the bus engine, a read operation to read data from the source and a write operation to write the data to the target for each of the one or more read-write commands to satisfy the direct memory access block move request,
    wherein performing the read operation and the write operation comprises:

placing a read transaction associated with a given read-write command in a new read queue within the bus engine;

if the read transaction is retried, placing the read transaction in an old read queue;

responsive to receiving the given read-write command at the bus engine, withholding an acknowledge to the direct memory access engine if buffer space within the bus engine is full; and responsive to buffer space becoming available in the bus engine, returning the acknowledge to the direct memory access engine, wherein the direct memory access engine does not issue a subsequent read-write command until the acknowledge is received at the direct memory access engine.

14. The method of claim 13, wherein each read-write command within the one or more read-write commands comprises a source address, a destination address, and a byte count.

15. The method of claim 14, wherein for a given read-write command the byte count corresponds to a buffer size of the bus engine.

16. The method of claim 13, further comprising:

responsive to receiving a given read-write command at the bus engine, returning an acknowledge to the direct memory access engine if buffer space within the bus engine is not full.

* * * * *